US012429102B2

(12) United States Patent
Lim et al.

(10) Patent No.: US 12,429,102 B2
(45) Date of Patent: Sep. 30, 2025

(54) ELECTRIC PARKING BRAKE AND METHOD OF OPERATING THE SAME

(71) Applicant: HL MANDO CORPORATION, Pyeongtaek-si (KR)

(72) Inventors: Woochul Lim, Yongin-si (KR); Daejune Jung, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 478 days.

(21) Appl. No.: 17/944,513

(22) Filed: Sep. 14, 2022

(65) Prior Publication Data
US 2023/0082813 A1  Mar. 16, 2023

(30) Foreign Application Priority Data
Sep. 15, 2021 (KR) .................. 10-2021-0123141

(51) Int. Cl.
| *B60T 13/74* | (2006.01) |
| *F16D 65/18* | (2006.01) |
| *F16D 121/24* | (2012.01) |
| *F16D 125/40* | (2012.01) |
| *F16D 125/50* | (2012.01) |
| *F16D 125/52* | (2012.01) |

(52) U.S. Cl.
CPC .......... *F16D 65/18* (2013.01); *F16D 2121/24* (2013.01); *F16D 2125/40* (2013.01); *F16D 2125/50* (2013.01); *F16D 2125/52* (2013.01)

(58) Field of Classification Search
CPC ............. F16D 2125/52; F16D 2125/44; F16D 2121/24; F16D 2125/40; F16D 65/18; B60T 13/741; F16H 1/225; F16H 2057/121; F16H 2702/06

See application file for complete search history.

(56) References Cited

U.S. PATENT DOCUMENTS

| 2004/0097322 A1* | 5/2004 | Chakraborty .......... B60K 17/16 475/225 |
| 2015/0136542 A1* | 5/2015 | Goh ........................ F16D 65/18 188/162 |
| 2017/0114848 A1* | 4/2017 | Park ...................... B60T 13/741 |
| 2018/0372177 A1* | 12/2018 | Esnee ................... F16D 55/228 |
| 2019/0003535 A1* | 1/2019 | Esnee ................... F16D 55/225 |
| 2021/0016760 A1* | 1/2021 | Hong .................... F16D 55/226 |

* cited by examiner

Primary Examiner — Nicholas J Lane
(74) Attorney, Agent, or Firm — LEE, HONG, DEGERMAN, KANG & WAIMEY

(57) ABSTRACT

Disclosed herein an electric parking brake including a ball-screw type power conversion unit installed in a caliper housing to convert a rotational force into a linear motion. The electric parking brake includes a motor configured to generate a rotational force, a first gear unit including a first connection portion, the first connection portion directly connected to a main helical gear provided on a motor shaft of the motor, a second gear unit including a second connection portion, the second connection portion spaced apart from the first connection portion by a predetermined distance and directly connected to the main helical gear, and a reduction gear unit connected to any one of the first gear unit and the second gear unit and configured to transmit the rotational force generated from the motor to a spindle of the power conversion unit, wherein any one of the first and second gear units is configured to perform a self-locking function when a parking braking force is generated.

11 Claims, 12 Drawing Sheets

ELECTRIC PARKING BRAKE AND METHOD OF OPERATING THE SAME

CROSS-REFERENCE TO RELATED APPLICATION(S)

This application is based on and claims priority under 35 U.S.C. § 119 to Korean Patent Application No. 10-2021-0123141, filed on Sep. 15, 2021 in the Korean Intellectual Property Office, the disclosure of which is incorporated herein by reference in its entirety.

TECHNICAL FIELD

The present disclosure relates to an electric parking brake (EPB) and a method of operating the same, and more particularly, to an electric parking brake capable of providing high-efficiency parking braking force through a single motor and performing a self-locking function, and a method of operating the same.

BACKGROUND

In general, a brake device is a device that stops a vehicle from moving during braking or parking, and serves to hold wheels of the vehicle from rotating.

Recently, EPB systems for electrically controlling operation of a parking brake have been widely used. The EPB system is mounted on a conventional caliper brake to perform a function of the parking brake.

A conventional EPB is automatically operated through a switch operation of a user, and to this end, includes a motor, a reduction device (a reducer for power transmission) that decelerates power of the motor to output, and a power conversion unit that is connected to the reduction device to convert rotational force into linear motion.

In such conventional EPBs, various reduction devices such as a gear assembly are provided to smoothly transmit rotational force of a motor to a power conversion unit, and for example, a cross helical gear assembly may be used. The cross helical gear assembly is commonly used in the EPBs because it is easy to switch a rotational direction and has a good contact ratio of gears, which may reduce noise considerably. At this time, when an operation of the motor is stopped after generating parking braking force, a nut-spindle type power conversion unit is provided to maintain a parking state. In other words, in the nut-spindle type power conversion unit, a nut and a spindle are directly screw-coupled, thereby performing a self-locking function that maintains a state in which parking force is generated.

However, the conventional EPBs satisfy performance standards required for a typical vehicle, but has a disadvantage that it is difficult to use in a large truck requiring large braking force. This is because efficiency of a system for converting torque of a motor into parking force through a nut-spindle type power conversion unit is low. To solve the above problem, if a ball-screw type power conversion unit with high efficiency of the system that converts the torque of the motor into parking force is used, the efficiency of the system may be increased, but may not be maintained parking force due to non-operation of a self-locking function.

Furthermore, to meet performance standards of large trucks requiring high output, the conventional EPBs are used with two motors and two power transmission structures, but it causes weight and cost to increase, as well as is difficult to apply due to a narrow installation space.

SUMMARY

An embodiment of the present disclosure is to provide an electric parking brake capable of providing high-efficiency parking braking force using a single motor and performing a self-locking function, and a method of operating the same.

Additional aspects of the disclosure will be set forth in part in the description which follows and, in part, will be obvious from the description, or may be learned by practice of the disclosure.

In accordance with various embodiments of the disclosure, an electric parking brake including a ball-screw type power conversion unit installed in a caliper housing to convert a rotational force into a linear motion, includes a motor configured to generate a rotational force, a first gear unit including a first connection portion, the first connection portion directly connected to a main helical gear provided on a motor shaft of the motor, a second gear unit including a second connection portion, the second connection portion spaced apart from the first connection portion by a predetermined distance and directly connected to the main helical gear, and a reduction gear unit connected to any one of the first gear unit and the second gear unit and configured to transmit the rotational force generated from the motor to a spindle of the power conversion unit, wherein any one of the first and second gear units is configured to perform a self-locking function when a parking braking force is generated.

The first and second gear units may have the same rotating central shaft toward the spindle, and have the same gear ratio.

The first and second gear units may have a cross helical gear assembly structure or a worm gear assembly structure, and the first and second gear units may have different gear assembly structures from each other.

The first gear unit may further include the first connection portion including a first vertical helical gear meshed with the main helical gear, a first connection shaft coupled to a rotation center of the first vertical helical gear to rotate, and a first bearing portion provided on the first connection shaft, a first helical gear provided on the first connection shaft to rotate together with the first connection shaft, and a second helical gear meshed with the first helical gear to change a rotation direction.

The second gear unit may further include the second connection portion including a second vertical helical gear meshed with the main helical gear, a second connection shaft coupled to a rotation center of the second vertical helical gear to rotate, and a second bearing portion provided on the second connection shaft, a worm gear provided on the second connection shaft to rotate together with the second connection shaft, and a worm wheel gear meshed with the worm gear to change a rotation direction.

The worm wheel gear and the second helical gear may be disposed to face each other so as to have the same rotating central shaft, and the worm wheel gear and the second helical gear may include a coupling portion, the coupling portion allowing the worm wheel gear and the second helical gear to be coupled to each other to rotate together.

The coupling portion may further include a first coupling portion protruding from a center of the second helical gear toward the worm wheel gear, and a second coupling portion protruding from a center of the worm wheel gear toward the second helical gear and press-fitted with the first coupling portion.

The worm wheel gear or the second helical gear may have gear teeth formed along an outer circumferential surface and has a cylindrical shape with one side open to have an accommodating space therein, and the accommodating space may be provided with the first coupling portion or the second coupling portion.

The second helical gear or the worm wheel gear may further include a gear portion formed in a ring shape with gear teeth formed on an outer circumferential surface thereof, and having fastening grooves formed at regular intervals along an inner circumferential surface thereof, and a rotating portion having fastening protrusions formed on an outer circumferential surface thereof so as to be mounted on the fastening grooves, wherein the rotating portion is configured to rotate together with the gear portion.

The reduction gear portion may further include a sun gear provided at a center of the worm wheel gear or the second helical gear and configured to rotate together with the worm wheel gear or the second helical gear, a plurality of planetary gears meshed with the sun gear, a ring gear formed as an internal gear to accommodate the plurality of planetary gears, and a carrier that rotatably supports the plurality of planetary gears, is installed to rotate coaxially with the sun gear, and outputs rotational power.

An output hole in which an internal gear is formed to be gear-coupled to the spindle may be provided at a center of the carrier.

The electric parking brake may further include a rotating central shaft passing through the sun gear and having one end press-fitted to the spindle and the other end press-fitted to the center of the second helical gear or the worm wheel gear.

The power conversion unit may include a spindle rotating by receiving the rotational force from the reduction gear unit, a nut screw-coupled to the spindle to move forward or backward by rotation of the spindle, and a plurality of balls interposed between the spindle and the nut.

In accordance with various embodiments of the disclosure, a method of operating an electric parking brake including a ball-screw type power conversion unit installed in a caliper housing to convert a rotational force into a linear motion, the method includes first and second gear units configured to rotate by directly receiving a rotational force of a motor when a parking brake is applied after a vehicle is stopped, and a reduction gear unit connected to any one of the first and second gear units to transmit the rotational force generated from the motor to a spindle of the power conversion unit, wherein the first gear unit is provided to have a cross helical gear assembly structure and the second gear unit is provided to have a worm gear assembly structure, and the first and second gear units are configured to perform a self-locking function when a parking braking force is generated, thereby maintaining a parking state when power of the motor is turned off.

The first and second gear units may have the same reduction ratio and the same rotating central shaft to rotate together.

In accordance with various embodiments of the disclosure, a method of operating an electric parking brake including a ball-screw type power conversion unit installed in a caliper housing to convert a rotational force into a linear motion, the method includes first and second gear units configured to rotate by directly receiving a rotational force of a motor when a parking brake is applied after a vehicle is stopped, and a reduction gear unit connected to any one of the first and second gear units to transmit the rotational force generated from the motor to a spindle of the power conversion unit, wherein the first gear unit is provided to have a worm gear assembly structure and the second gear unit is provided to have a cross helical gear assembly structure, and the first and second gear units are configured to perform a self-locking function when a parking braking force is generated, thereby maintaining a parking state when power of the motor is turned off.

The first and second gear units may have the same reduction ratio and the same rotating central shaft to rotate together.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
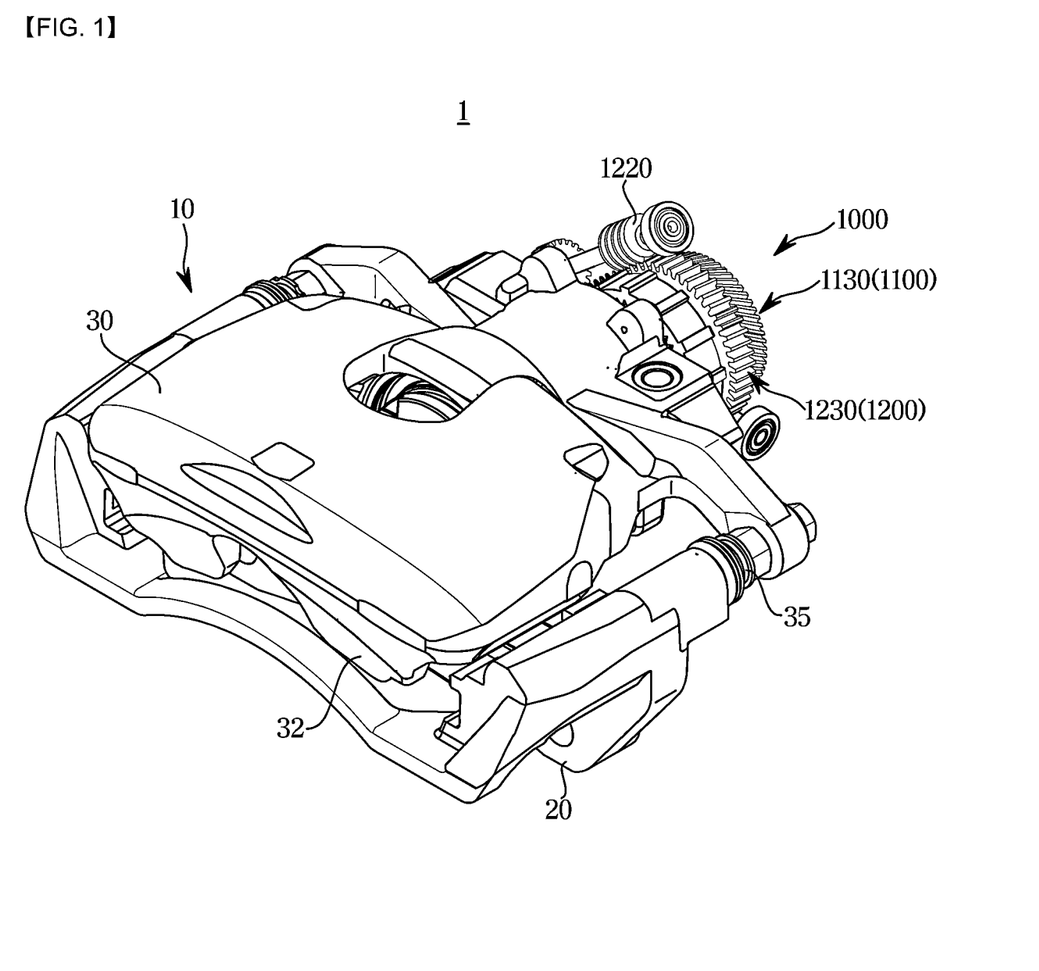
FIG. 1 is a perspective view illustrating an EPB according to an exemplary embodiment of the present disclosure.
Figure 2:
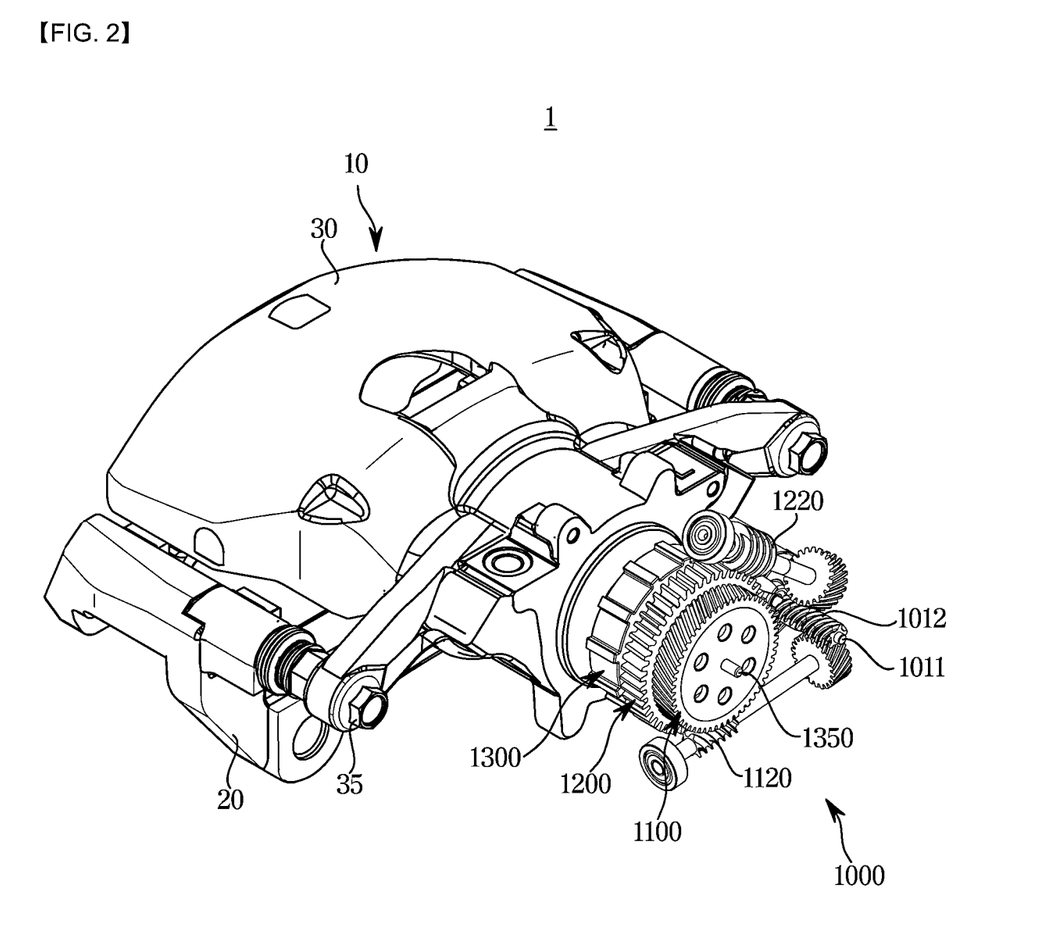
FIG. 2 is a rear perspective view illustrating the EPB according to an exemplary embodiment of the present disclosure.
Figure 3:
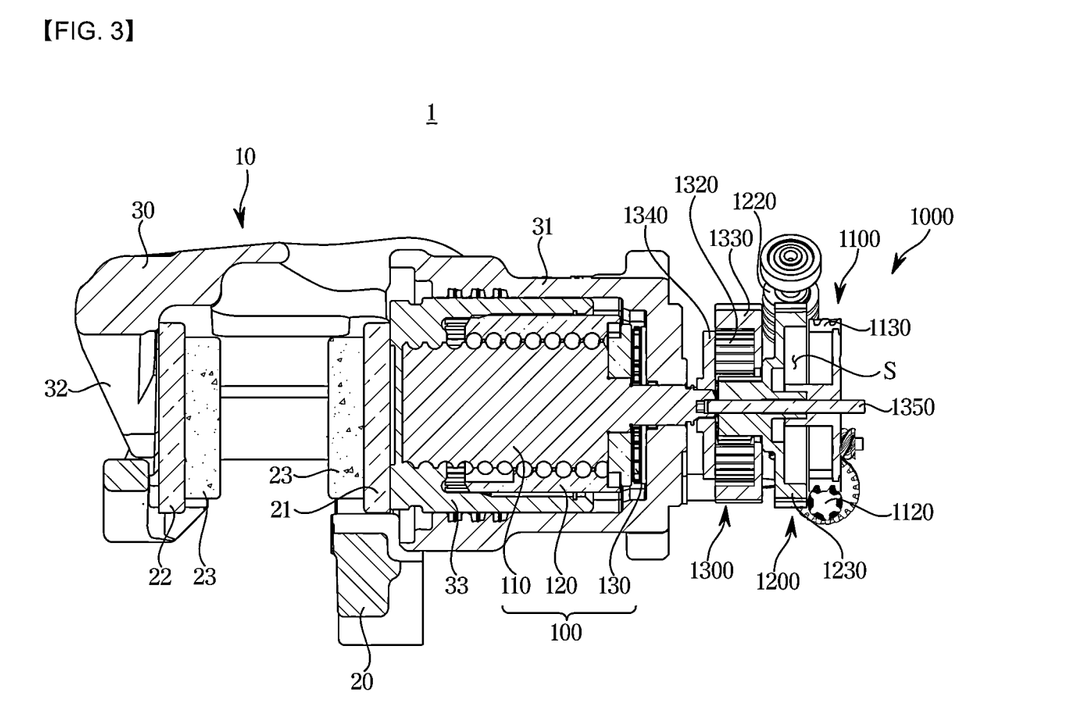
FIG. 3 is a side cross-sectional view illustrating the EPB according to an exemplary embodiment of the present disclosure.
Figure 4:
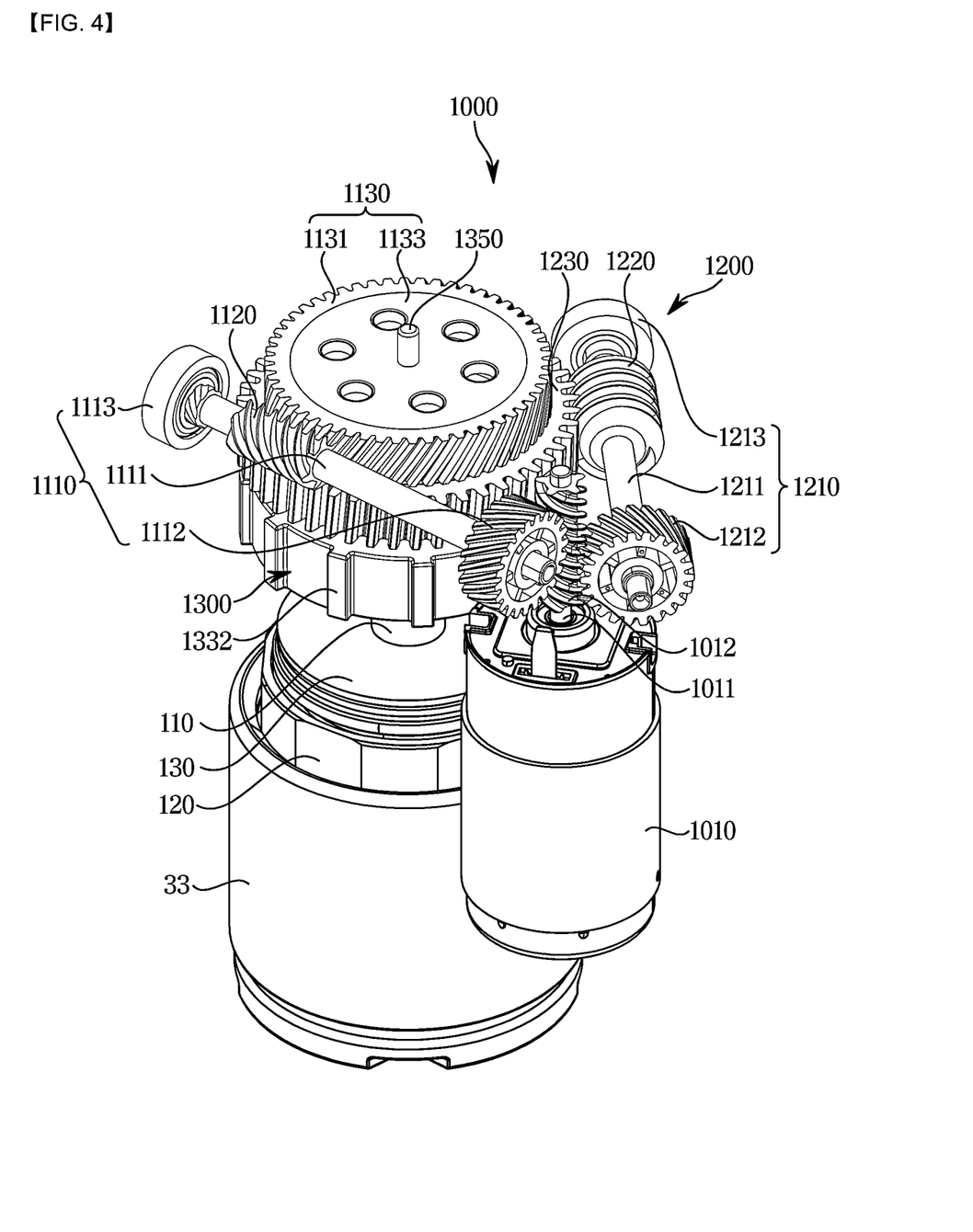
FIG. 4 is a perspective view illustrating a state in which an actuator and a power conversion unit provided in the EPB according to an exemplary embodiment of the present disclosure are combined.
Figure 5:
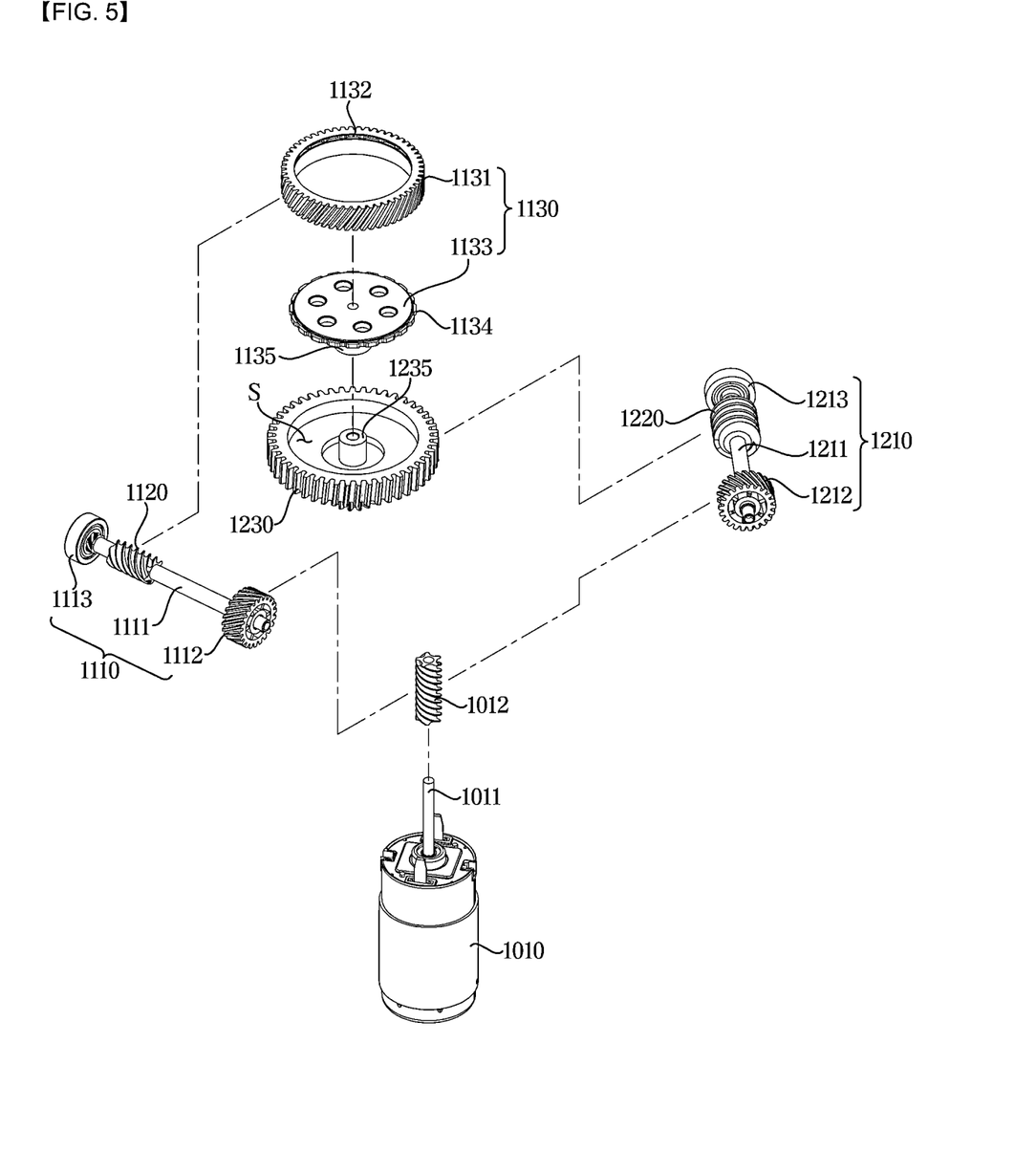
FIG. 5 is an exploded perspective view illustrating a first gear unit and a second gear unit provided in the EPB according to an exemplary embodiment of the present disclosure.
Figure 6:
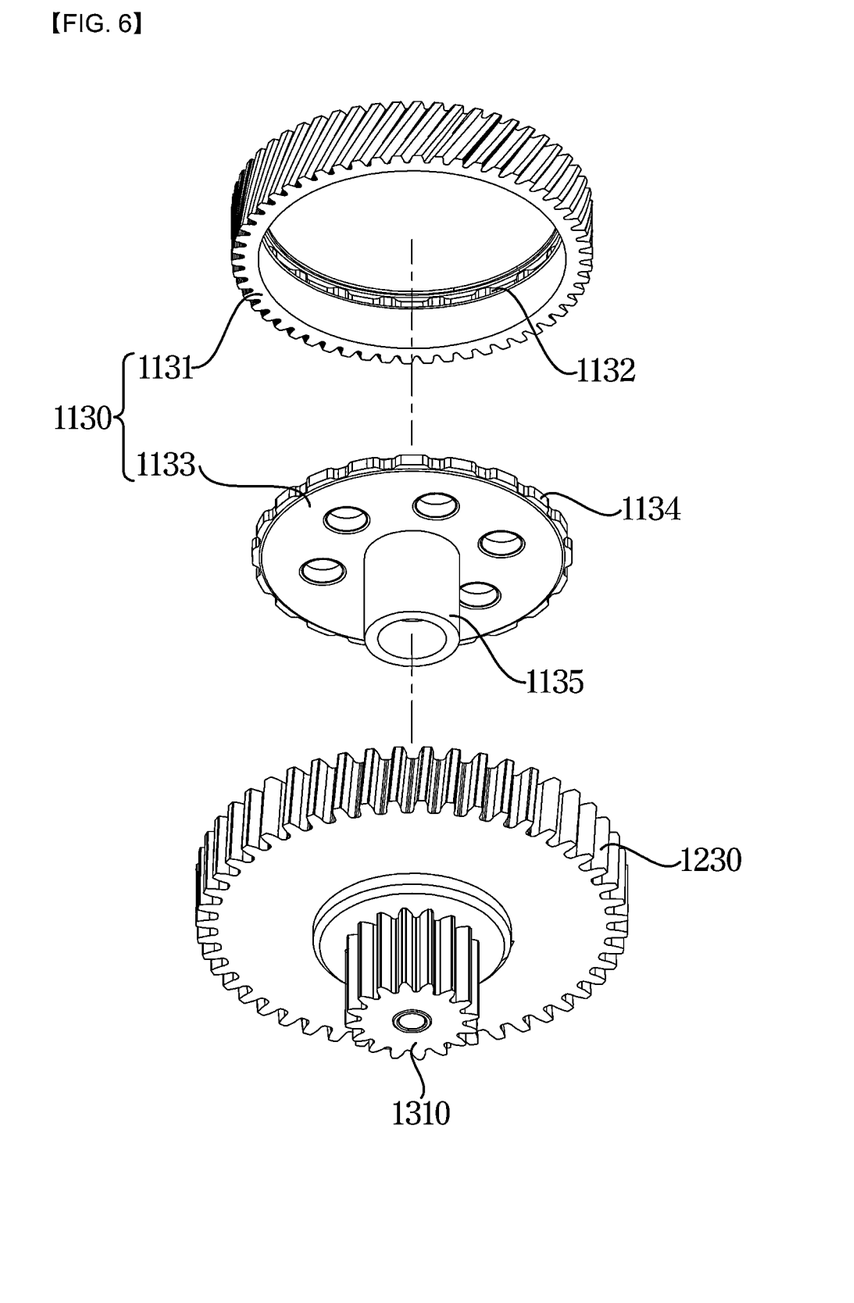
FIG. 6 is a view illustrating a state in which a worm wheel gear and a second helical gear provided in the EPB according to an exemplary embodiment of the present disclosure are combined.
Figure 7:
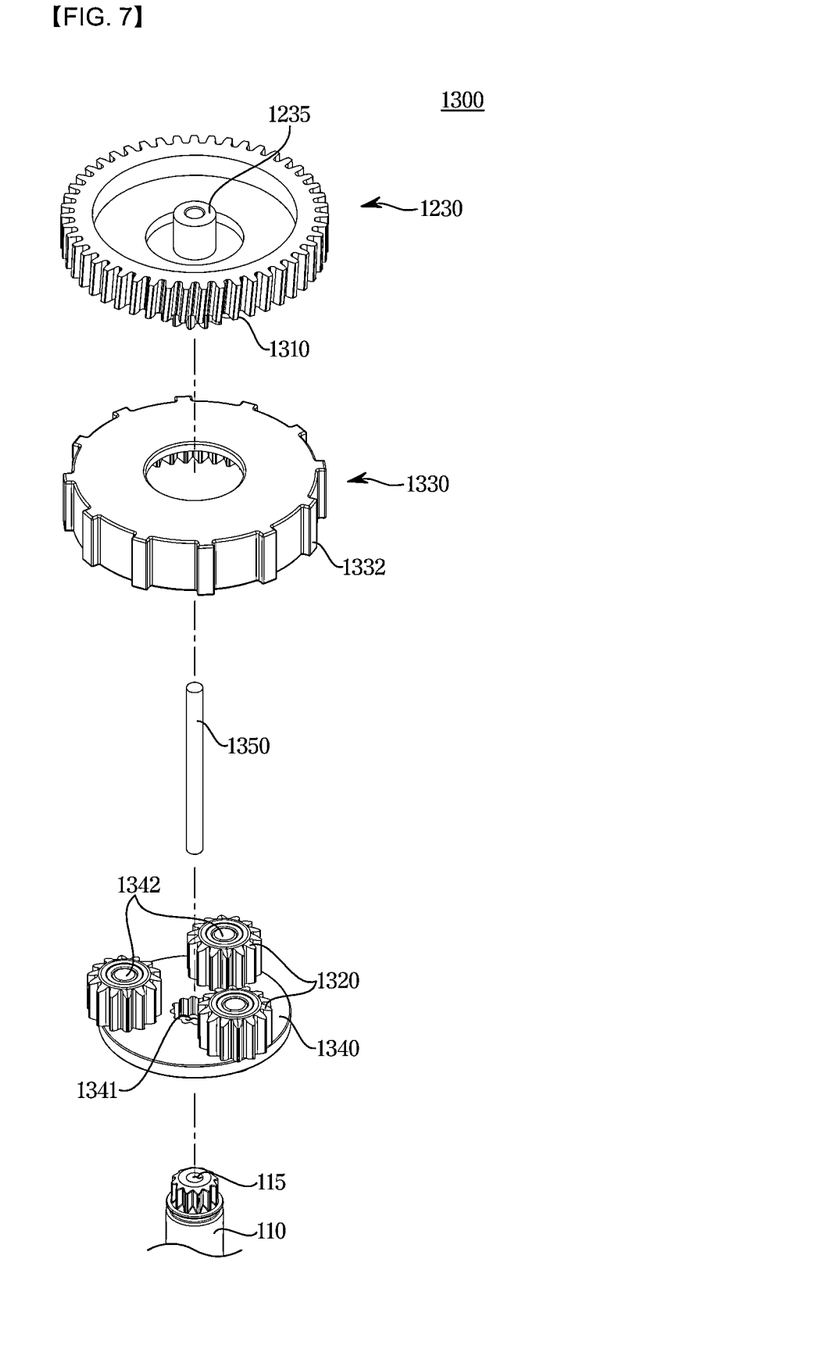
FIGS. 7 and 8 are exploded perspective views each illustrating a reduction gear unit provided in the EPB according to an exemplary embodiment of the present disclosure.
Figure 8:
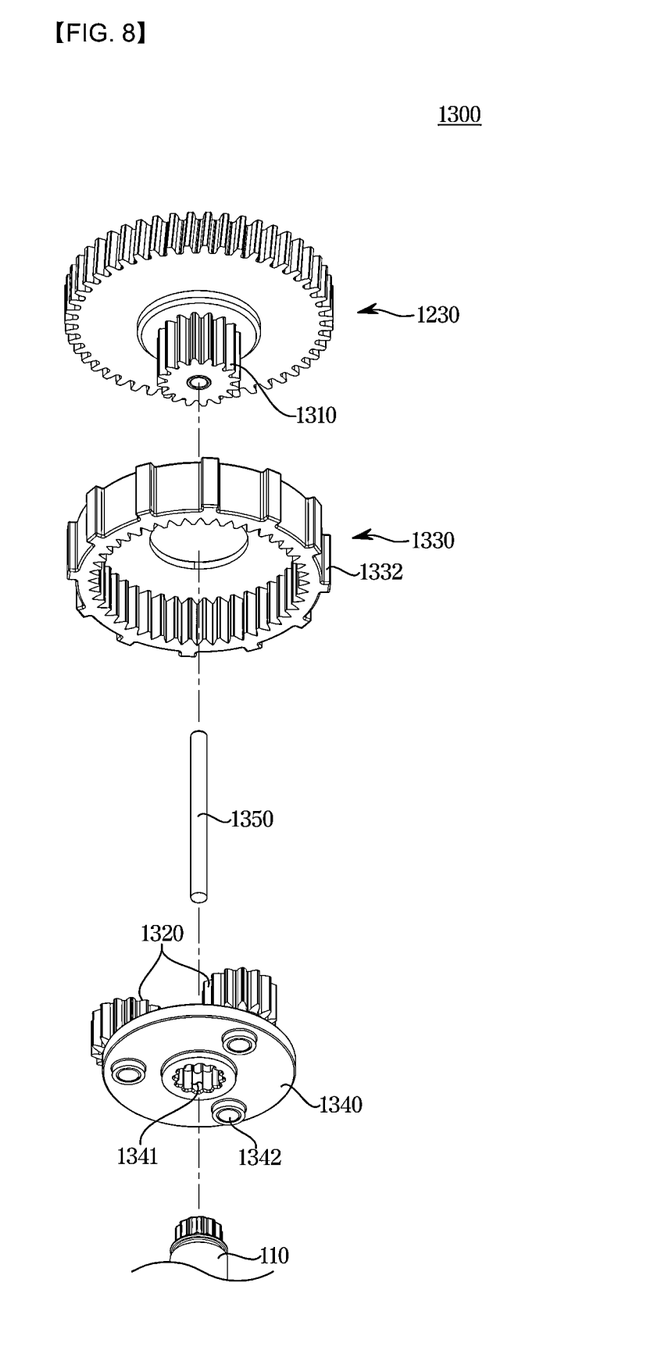
Figure 9:
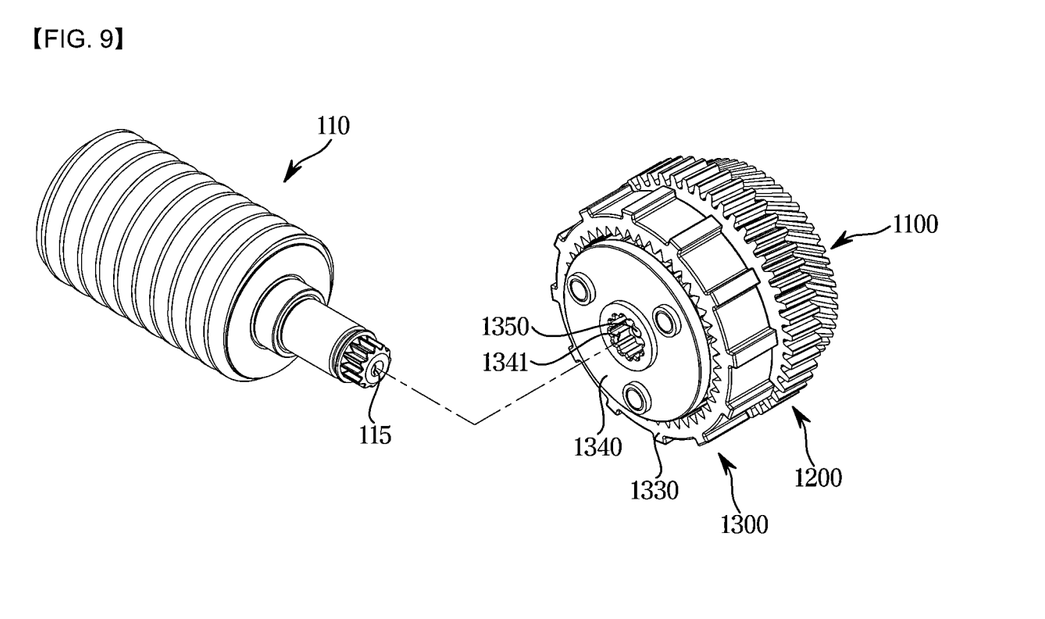
FIG. 9 is a view illustrating a state in which the reduction gear unit and a spindle provided in the EPB according to an exemplary embodiment of the present disclosure are combined.

FIG. 1 is a perspective view illustrating an EPB according to an exemplary embodiment of the present disclosure, FIG. 2 is a rear perspective view illustrating the EPB according to an exemplary embodiment of the present disclosure, FIG. 3 is a side cross-sectional view illustrating the EPB according to an exemplary embodiment of the present disclosure, FIG. 4 is a perspective view illustrating a state in which an actuator and a power conversion unit provided in the EPB according to an exemplary embodiment of the present disclosure are combined, FIG. 5 is an exploded perspective view illustrating a first gear unit and a second gear unit provided in the EPB according to an exemplary embodiment of the present disclosure, FIG. 6 is a view illustrating a state in which a worm wheel gear and a second helical gear provided in the EPB according to an exemplary embodiment of the present disclosure are combined, FIGS. 7 and 8 are exploded perspective views each illustrating a reduction gear unit provided in the EPB according to an exemplary embodiment of the present disclosure, and FIG. 9 is a view illustrating a state in which the reduction gear unit and a spindle provided in the EPB according to an exemplary embodiment of the present disclosure are combined.

Referring to FIGS. 1 to 9, an electric parking brake (EPB) 1 according to an exemplary embodiment of the disclosure may include a caliper brake 10, a power conversion unit 100, and an actuator 1000.

The caliper brake 10 may perform a braking operation by pressing a disk (not shown) that rotates together with wheels of a vehicle. The caliper brake 10 includes a pair of pad plates 21 and 22 to which a friction pad 23 for pressing the disc are respectively attached, a carrier 20 to which the pair of pad plates 21 and 22 are installed, a caliper housing 30 that is slidably installed on the carrier 20 to operate the pair of pad plates 21 and 22, and a piston 33 installed so as to move forward and backward inside the caliper housing 30.

The pair of pad plates 21 and 22 includes an inner pad plate 21 disposed to contact the piston 33 and an outer pad plate 22 disposed to contact a finger part 32 of the caliper housing 30, which will be described later. The pair of pad plates 21 and 22 are installed on the carrier 20 fixed to a vehicle body so as to move forward and backward against opposite sides of the disk, leading to performing a braking operation. Furthermore, the friction pad 23 is attached to one surface of each of the pad plates 21 and 22 facing the disk.

The caliper housing 30 is slidably installed on the carrier 20 through a guide rod 35. The caliper housing 30 includes a cylinder 31 in which the piston 33 is installed on a rear side thereof (a right side based on FIG. 3) and the finger part 32 bent downward on a front side thereof to operate the outer pad plate 22 (a left side based on FIG. 3). The finger part 32 and the cylinder 31 are integrally formed.

The piston 33 is provided in a cylindrical shape with a cup-shaped interior and is slidably inserted into the cylinder 31. The piston 33 presses the inner pad plate 21 against the disk by braking oil pressure (a brake oil) or an axial force of the power conversion unit 100 according to an operation of the actuator 1000. Accordingly, as a pressing force is applied by hydraulic pressure or power conversion unit 100 for braking into the cylinder 31, the piston 33 moves forward toward the inner pad plate 21 to press the inner pad plate 21, and in turn, by the reaction force thereof the caliper housing 30 operates in a opposite direction to the piston 33 such that the finger part 32 presses the outer pad plate 22 against the disk, thereby performing braking.

The power conversion unit 100 receives a driving force from the actuator 1000 and converts a rotational motion into a linear motion to press or release the piston 33, and may be provided as a ball-screw type converting device. At this time, since efficiency of converting a torque of a motor into a parking force is higher in a ball-screw type power conversion structure than in a conventional nut-spindle type power conversion structure consisting of a screw coupling, this embodiment uses the ball-screw type converting device.

As shown in the drawings, the power conversion unit 100 may include a spindle 110 that rotates by receiving a driving force within the cylinder 31, a nut 120 that is connected to the spindle 110 and moves forward or backward by forward and reverse rotation of the spindle 110, and a plurality of balls (not shown) interposed between the nut 120 and the spindle 110 and the nut 120. At this time, the nut 120 may be provided so that rotation thereof is limited inside the piston 33 so as to move linearly according to the rotation of the spindle 110.

The spindle 110 has a predetermined length, and a thread may be formed on an outer circumferential surface for coupling with the nut 120. The nut 120 is coupled to one side (front side, which is the left side based on FIG. 3) of the spindle 110, and the other side (rear side, which is the right side based on FIG. 3) thereof is connected to the actuator 1000 to receive the driving force. For example, the other side of the spindle 110 may be coupled to an output hole 1341 of the carrier 1340 in a gear coupling structure for receiving the driving force, the output hole 1341 of the carrier 1340 through which torque is output from the actuator 1000 to be described later. Furthermore, a press-fitting groove 115 may be formed on the other end of the spindle 110. The press-fitting groove 115 is a part into which a rotating central shaft 1350 to be described later is press-fitted, and a structure in which the rotating central shaft 1350 is press-fitted to the press-fitting groove 115 will be described again below.

The nut 120 may have a thread formed therein so as to mesh with the thread of the spindle 110 via balls (not shown). The nut 120 may be provided inside the piston 33 in a state in which rotation thereof is restricted. Accordingly, the nut 120 linearly moves according to the forward and reverse rotational directions of the spindle 110 to press or release the piston 33.

On the other hand, an undescribed reference numeral 130 denotes a thrust bearing for supporting an axial force generated during parking braking through the power conversion unit 100.

The actuator 1000 may include a motor 1010, first and second gear units 1100 and 1200 connected to the motor 1010, and a reduction gear unit 1300 connected to any one of the first and second gear units 1100 and 1200. Although not shown in the drawings, the actuator 1000 may be accommodated in the housing and installed in the caliper brake 10.

The motor 1010 receives power by operating a switch (not shown) provided on a driver seat of the vehicle and converts electrical energy into mechanical rotational kinetic energy. The control of the braking operation according to an operation signal of the switch may be performed by an electronic control unit (ECU) of the vehicle (not shown). Rotational force of the motor 1010 is transmitted to the first and second gear units 1100 and 1200 through a main helical gear 1012 installed on a motor shaft 1011.

According to exemplary embodiment of the present disclosure, any one of the first and second gear units 1100 and 1200 is provided to transmit power to the power conversion unit 100 through the reduction gear unit 1300, and the other may be provided to perform a self-locking function when a parking braking force is generated.

Figure 10:
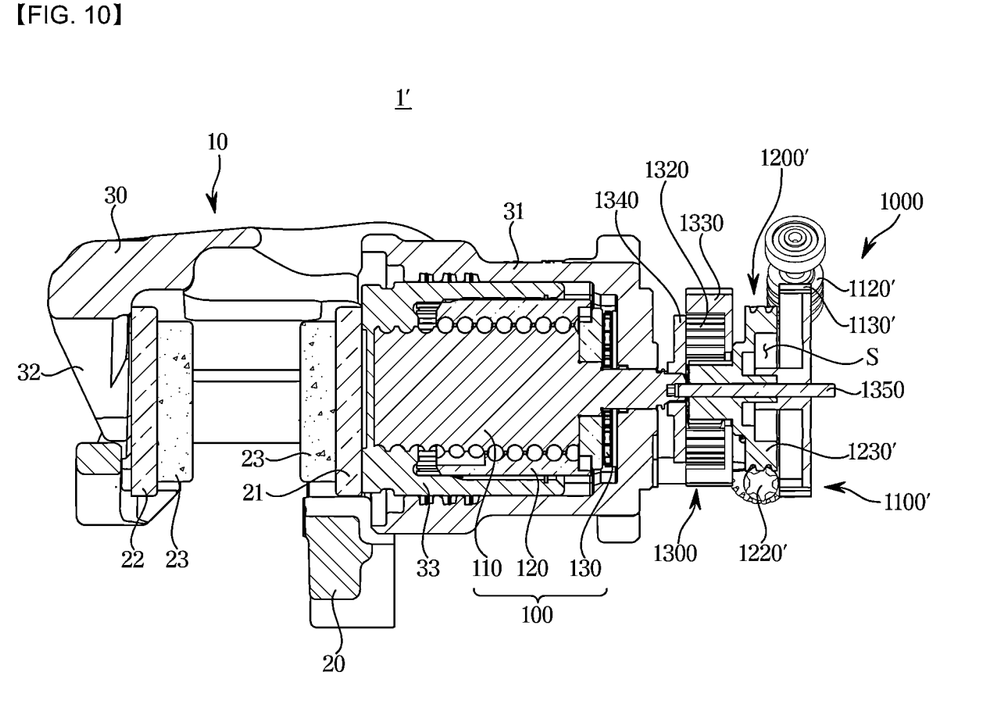
FIG. 10 is a side cross-sectional view illustrating an EPB according to another embodiment of the present disclosure.
Figure 11:
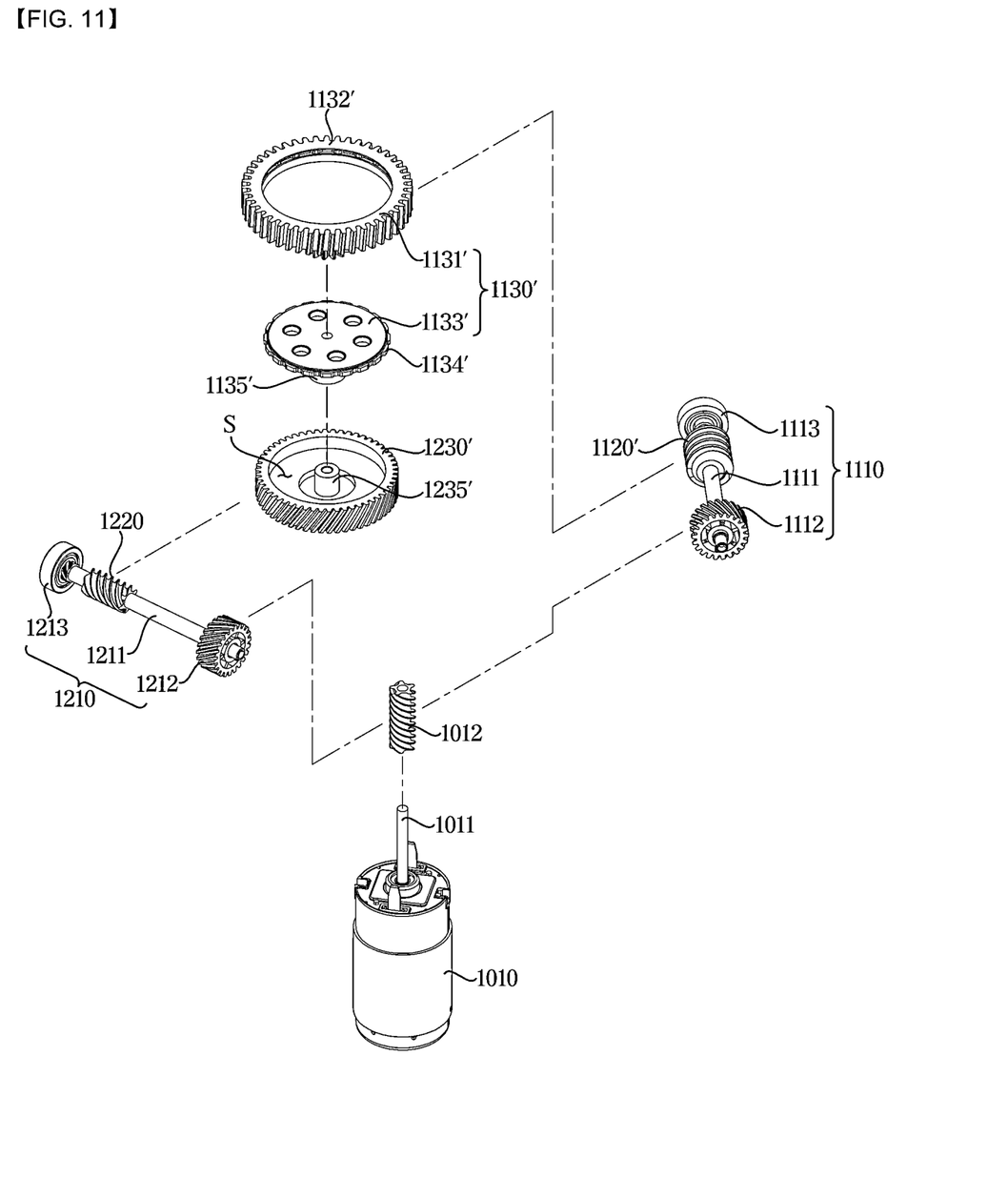
FIG. 11 is an exploded perspective view illustrating a first gear unit and a second gear unit provided in the EPB according to another embodiment of the present disclosure.
Figure 12:
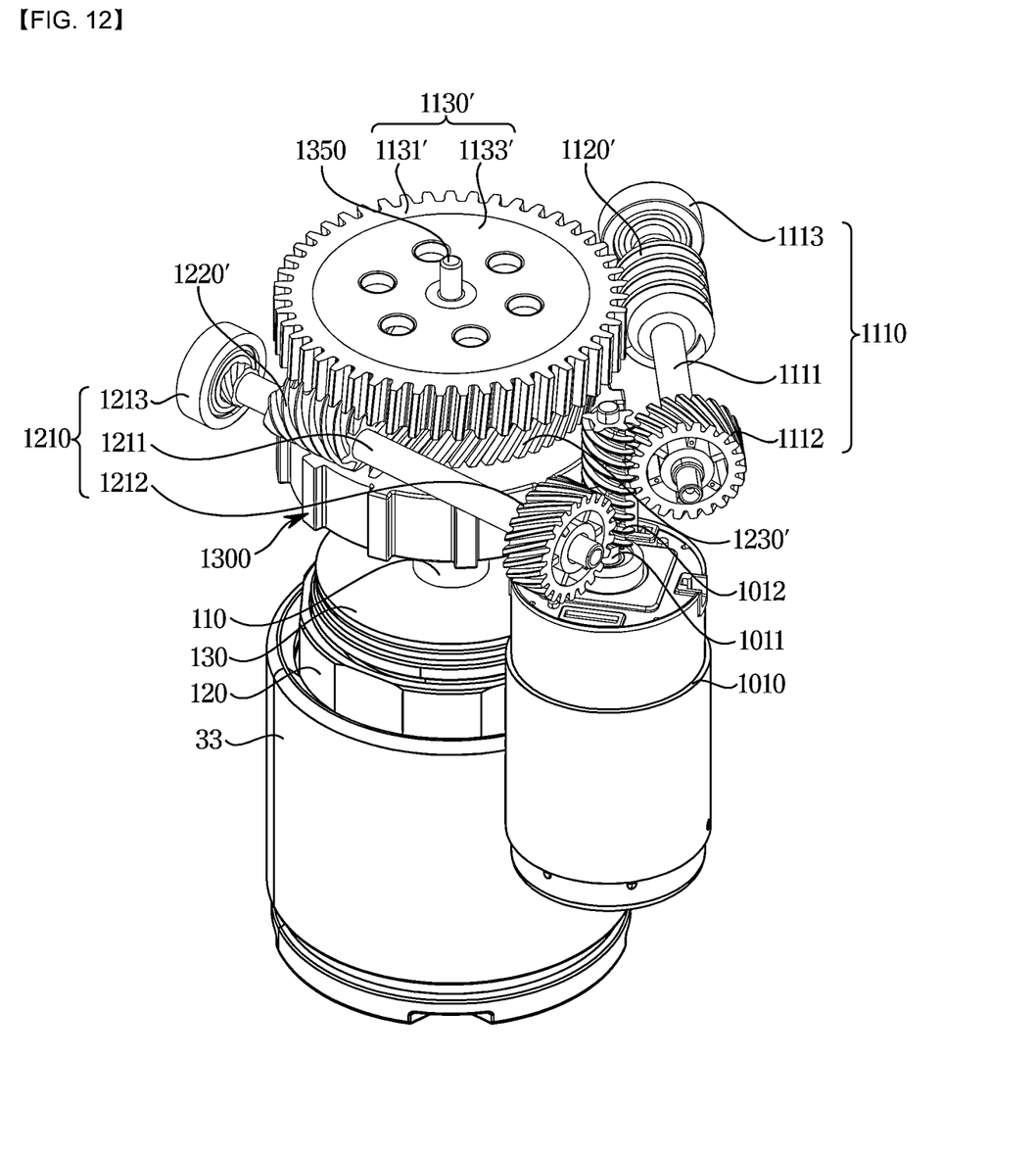
FIG. 12 is a perspective view illustrating a state in which an actuator and a power conversion unit provided in the EPB according to another embodiment of the present disclosure are combined.

The first and second gear units 1100 and 1200 are provided to have a cross helical gear assembly structure or a worm gear assembly structure, and the first and second gear units 1100 and 1200 may have different gear assembly structures. According to an exemplary embodiment of the present disclosure, the first gear unit 1100 may be provided in the cross helical gear assembly structure, and the second gear unit 1200 may have the worm gear assembly structure. Furthermore, according to another embodiment of the present disclosure, as shown in FIGS. 10 to 12, the first gear unit 1100' may be provided in the worm gear assembly structure and the second gear unit 1200' may be provided in the cross helical gear assembly structure. The structure of such another embodiment will be described again below.

The first and second gear units 1100 and 1200 may have the same central axis of rotation toward the spindle 110 and receive rotational force. At this time, the first and second gear units 1100 and 1200 have the same gear ratio.

More specifically, the first gear unit 1100 includes a first connection portion 1110 directly connected to the main helical gear 1012, a first helical gear 1120 provided in the first connection portion 1110, and a second helical gear 1230 meshed with the first helical gear 1120.

The first connection portion 1110 may include a first vertical helical gear 1112 meshed with the main helical gear 1012, a first connection shaft 1111 coupled to a rotation center of the first vertical helical gear 1112 to rotate, and a first bearing portion 1113 provided on the first connection shaft 1111. At this time, the first bearing portion 1113 is illustrated as being installed only at one end of the first connection shaft 1111, but is not limited thereto, and may be installed in a position in a longitudinal direction of the first connection shaft 1111 so that the first connection shaft 1111 may stably rotate.

The first vertical helical gear 1112 is meshed with the main helical gear 1012 and rotates while changing a rotational direction to a direction perpendicular to the motor shaft 1011. As the first vertical helical gear 1112 rotates, the first connection shaft 111 rotates together, and in turn the first helical gear 1120 provided on the first connection shaft 1111 rotates together.

The second helical gear 1130 is meshed with the first helical gear 1120 to change the rotation direction. More specifically, the second helical gear 1130 may include a ring-shaped gear portion 1131 having gear teeth formed on an outer circumferential surface thereof, and a rotating portion 1133 coupled to the gear portion 1131 to rotate together with the gear portion 1131. Fastening grooves 1132 are formed at regular intervals on an inner circumferential surface of the gear portion 1131, and fastening protrusions 1134 corresponding to the fastening grooves 1132 are provided on an outer circumferential surface of the rotating part 1133. Accordingly, because the fastening protrusions 1134 are fitted and coupled to the fastening grooves 1132, the gear portion 1131 and the rotating portion 1133 rotate together. The second helical gear 1130, by changing the rotational direction from the first helical gear 1120 through the gear teeth formed on the outer circumferential surface, is provided such that the rotational center thereof is parallel to the rotational center of the motor shaft 1011, thereby being provided to be coaxial with the rotation center of the spindle 110.

Meanwhile, although the second helical gear 1130 is illustrated and described as constituted and assembled with the gear portion 1131 and the rotating portion 1133, but is not limited thereto, and the gear portion 1131 and the rotating portion 1133 may be manufactured integrally and used as the one body.

Because the first gear unit 1100 as described above is provided to have the cross helical gear assembly structure, the contact ratio of gears is good, so that a considerable amount of noise may be reduced and efficiency of power transmission may be improved.

The second gear unit 1200 includes a second connection portion 1210 spaced apart from the first connection portion 1110 and directly connected to the main helical gear 1012, a worm gear 1220 provided on the second connection portion 1210, and a worm wheel gear 1230 meshed with the worm gear 1220.

The second connection portion 1210 may include a second vertical helical gear 1212 meshed with the main helical gear 1012, a second connection shaft 1211 coupled to a rotation center of the second vertical helical gear 1212 to rotate, and a second bearing portion 1213 provided on the second connection shaft 1211. At this time, the second bearing portion 1213 is illustrated as being installed only at one end of the second connection shaft 1211, but is not limited thereto, and may be installed in a position in a longitudinal direction of the second connection shaft 1211 so that the second connection shaft 1211 may stably rotate.

The second vertical helical gear 1212 is meshed with the main helical gear 1012 and rotates while changing a rotation direction to a direction perpendicular to the motor shaft 1011. As the second vertical helical gear 1212 rotates, the second connection shaft 1211 rotates together, and in turn the worm gear 1220 provided on the second connection shaft 1211 rotates together.

The worm wheel gear 1230 is meshed with the worm gear 1220 to change the rotation direction. More specifically, the worm wheel gear 1230 has gear teeth on an outer circumferential surface thereof, and may have a cylindrical shape with one side open to have an accommodating space S therein. In other words, the worm wheel gear 1230, by changing the rotational direction from the worm gear 1220 through the gear teeth formed on the outer circumferential surface, is provided such that the rotational center thereof is parallel to the rotational center of the motor shaft 1011, thereby being provided to be coaxial with the rotation center of the spindle 110. Accordingly, the worm wheel gear 1230 and the second helical gear 1130 are arranged to face each other, and are provided to have the same rotating central shaft 1350.

Because the second gear unit 1200 as described above has the worm gear assembly structure to increase the friction force between the gears, it is possible to prevent a phenomenon in which the parking force is released when power of the motor 1010 is turned off. In other words, when the operation of the motor 1010 is stopped after the parking braking force is applied, the reverse rotation of the spindle 110 is prevented because the self-locking function is implemented by the worm gear 1220 and the worm wheel gear 1230 having a large reduction ratio. As a result, a parking state may be maintained.

According to exemplary embodiment of the present disclosure, the second helical gear 1130 of the first gear unit 1100 and the worm wheel gear 1230 of the second gear unit 1200 may be provided with a coupling portion to rotate together. The coupling portion may include a first coupling portion 1135 protruding from a center portion of the second helical gear 1130 toward the worm wheel gear 1230, and a second coupling portion 1235 protrudes from a center portion of the worm wheel gear 1230 toward the second helical gear 1130 and is press-fitted with the first coupling portion 1135.

The first coupling portion 1135 is formed in a center of the rotating portion 1133 and may be provided to have a cylindrical shape with one side open so that the second coupling portion 1235 may be inserted thereinto.

The second coupling portion 1235 may be formed to be disposed in the accommodating space S at the center of the worm wheel gear 1230. Accordingly, the first and second coupling portions 1135 and 1235 are coupled in the accommodating space S, it is possible to provide a compact assembly structure.

By the connection of the first and second coupling portions 1135 and 1235, the second helical gear 1130 and the worm wheel gear 1230 may rotate together, and by the rotating central shaft 1350, which will be described later, being press-fitted through the coupling portions 1135 and 1235, the first and second coupling portions 1135 and 1235 may rotate on the same central axis. Meanwhile, because the second helical gear 1130 and the worm wheel gear 1230 are provided to have the same gear ratio, they receive rotational force through the first and second connection portions 1110 and 1210 to have same rotation without rotating relative to each other during rotation.

The reduction gear unit 1300 is connected to the first gear unit 1100 or the second gear unit 1200 to transmit the rotational force generated from the motor 1010 to the spindle 110. The reduction gear unit 1300 may include a sun gear 1310, a plurality of planetary gears 1320 meshed with the outer side of the sun gear 1310, a ring gear 1343 formed as an internal gear to accommodate the plurality of planetary gears 1320, and a carrier 1340. The carrier 1340 rotatably supports the plurality of planetary gears 1320, is installed to rotate coaxially with the sun gear 1310, and outputs rotational power.

The sun gear 1310 may be provided at the center of the worm wheel gear 1230 or the second helical gear 1130. As illustrated in the drawings, the sun gear 1310 may be provided at the center of the worm wheel gear 1230 to rotate together with the worm wheel gear 1230. At this time, the sun gear 1310 may be integrally provided at the center of the worm wheel gear 1230 or may be separately provided and coupled.

The plurality of planetary gears 1320 may be provided in three or four in consideration of efficiency and economy, and are respectively rotatably coupled to branch shafts 1342 in three directions branched from the carrier 1340.

The ring gear 1330 penetrates up and down, accommodates the plurality of planetary gears 1320 therein, and is provided with an internal gear so as to mesh with the plurality of planetary gears 1320. The ring gear 1330 may have protrusions 1332 protruding from an outer surface to be fixed to the housing of the actuator 1000. Accordingly, the plurality of planetary gears 1320 may rotate while rotation and revolution within the ring gear 1330 according to the rotation of the sun gear 1310.

The carrier 1340 may have in the form of a disk. In addition, the branch shafts 1342 of the plurality of planetary gear spaced apart from each other by a predetermined distance along a circumferential direction are provided on one surface of the carrier 1340, and an output hole 1341 is provided in a center thereof to be coupled to the spindle 110. The output hole 1341 is formed coaxially with the sun gear 1310.

The output hole 1341 may be provided to have an internal gear to be gear-coupled to the spindle 110 so as to transmit a rotational force to the spindle 110. Furthermore, the output hole 1341 and the spindle 110 may be spline-coupled. As a result, as the carrier 1340 rotates, the spindle 110 rotates together.

On the other hand, the reduction gear unit 1300 may further include the rotating central shaft 1350 so that the transmission of rotational force through the first gear unit 1100 and the self-locking function through the second gear unit 1200 may be more smoothly implemented. The rotating central shaft 1350 has a predetermined length, one end thereof is press-fitted into the press-fitting groove 115 of the spindle 110 and the other end thereof is press-fitted after passing through the center of the second helical gear 1130. In other words, the rotating central shaft 1350 forms a central axis of the spindle 110, the output hole 1341 of the carrier 1340, the sun gear 1310, the first gear unit 1100, and the second gear unit 1200. The rotating central shaft 1350 may be press-fitted after passing through the center of the sun gear 1310, and also passing through the first and second coupling portions 1135 and 1235.

Although the sun gear 1310 has a structure in which the sun gear 1310 rotates together with the worm wheel gear 1230 when the torque of the motor 1010 is transmitted to the spindle 110 through the reduction gear unit 1300, the worm wheel gear 1230 and the second helical gear 1130 are coupled to have the same gear ratio and rotates together, so that power transmission through the first and second helical gears 1120 and 1130 may be achieved. Furthermore, after the parking braking force is generated, a parking braking state may be maintained by the second gear unit 1200 having the worm gear assembly structure.

Hereinafter, an operation state of generating the parking braking force of the EPB according to an exemplary embodiment of the present disclosure will be described.

When a driver operates the parking brake after stopping the vehicle, the motor 1010 is driven to rotate the motor shaft 1011. Accordingly, the first and second connection portions 1110 and 1210 meshed with the main helical gear 1012 coupled to the motor shaft 1011 rotate together in the same direction. Accordingly, the second helical gear 1130 of the first gear unit 1100 and the worm wheel gear 1230 of the second gear unit 1200 are rotated by receiving the rotational force. At this time, because the second helical gear 1130 and the worm wheel gear 1230 are coupled to each other by the coupling portions 1135 and 1235 so as to have the same rotating central shaft 1350 and are provided to have the same gear ratio, they may have same rotation without rotating relative to each other.

The sun gear 1310 is provided at the lower center of the worm wheel gear 1230 and rotates together with the worm wheel gear 1230, thereby transmitting the rotational force to the plurality of planetary gears 1320. And, the plurality of planetary gears 1320 rotate and revolve within the ring gear 1330 according to the rotation of the sun gear 1310. Accordingly, as the carrier 1340 rotates coaxially with the sun gear 1310 by the plurality of orbiting planetary gears 1320, the rotational force is outputted to the spindle 110.

The spindle 110 rotates by receiving the rotational force, and the nut 120 converts the rotational force into a linear motion to press the piston 33, thereby generating parking braking force. At this time, because the worm wheel gear 1230 and the second helical gear 1130 have the same rotating central shaft 1350 and are provided to have the same gear ratio, the efficiency of power transmission to the spindle 110 by the helical gear assembly is improved, and also the efficiency of converting the torque of the motor 1010 into the parking force by the ball-screw type power conversion unit 100 is improved. Furthermore, because the friction between the gears increases due to the second gear unit 1200 being provided to have the worm gear assembly structure, a phenomenon in which the parking force is released when the power of the motor 1010 is turned off, that is, the reverse rotation of the spindle 110 is prevented. Accordingly, the parking state may be maintained.

When releasing the braking, a driver release the brake by manipulating the parking switch on the driver seat. At this time, since the motor 1010 generates the rotational force in the reverse direction during parking braking, the first gear unit 1100, the second gear unit 1200, the reduction gear unit 1300, and the spindle 110 rotate in the reverse direction during parking braking. As a result, the nut 120 releases the pressure of the piston 33, thereby releasing the parking force.

According to an exemplary embodiment of the present disclosure, it has been shown and described that the first gear unit 1100 is provided in the cross helical gear assembly structure and the second gear unit 1200 is provided in the worm gear assembly structure, but as described above, the first gear unit 1100' may be provided in the worm gear assembly structure, and the second gear unit 1200' may be provided in the cross helical gear assembly structure. This exemplary embodiment is shown in FIGS. 10 to 12.

FIG. 10 is a side cross-sectional view illustrating an EPB according to another embodiment of the present disclosure, FIG. 11 is an exploded perspective view illustrating a first gear unit and a second gear unit provided in the EPB according to another embodiment of the present disclosure, and FIG. 12 is a perspective view illustrating a state in which an actuator and a power conversion unit provided in the EPB according to another embodiment of the present disclosure are combined. Herein, the same reference numerals as in the drawings of the embodiment shown above refer to members having the same function. For example, the EPB 1' according to the present embodiment differs only in that the first gear unit 1100' has the worm gear assembly structure and the second gear unit 1200' has the cross helical gear assembly compared to the previous embodiment, and the reaming configurations are the same.

Referring to FIGS. 10 to 12, the first gear unit 1100' includes the first connection portion 1110 directly connected to the main helical gear, a worm gear 1120' provided in the first connection portion 1110, and a worm wheel gear 1130' meshed with the worm gear 1120'.

The first connection portion 1110 may include the first vertical helical gear 1112 meshed with the main helical gear 1012, the first connection shaft 1111 coupled to the rotation center of the first vertical helical gear 1112 to rotate, and the first bearing portion 1113 provided on the first connection shaft 1111.

The worm wheel gear 1130' may include a gear portion 1131' and a rotating portion 1133' coupled to the gear portion 1131' to rotate together, and a first coupling portion 1135' for coupling with a second helical gear 1230' may be formed in the rotating portion 1133'. The gear portion 1131' and the rotating portion 1133' are coupled through fastening grooves 1132', which are formed in the gear portion 1131', and fastening protrusions 1134', which are formed on an outer circumferential surface of the rotating portion 1133' and fitted into the fastening grooves 1132', and accordingly, they rotate together.

The second gear unit 1200' includes the second connection portion 1210 spaced apart from the first connection portion 1110 and directly connected to the main helical gear portion 1012, a first helical gear 1220' provided on the second connection portion 1210, and a second helical gear 1230' meshed with the first helical gear 1220'.

The second connection portion 1210 may include the second vertical helical gear 1212 meshed with the main helical gear 1012, the second connection shaft 1211 coupled to the rotation center of the second vertical helical gear 1212 to rotate, and the second bearing portion 1213 provided on the second connection shaft 1211.

The second helical gear 1230' is provided to have an accommodating space therein, and a second coupling portion 1235' may be formed in the accommodating space S to be coupled to the facing worm wheel gear 1130'.

Furthermore, the sun gear 1310 of the reduction gear unit 1300 may be provided on the second helical gear 1230 ' opposite to the second coupling portion 1235'.

The rotational force of the motor 1010 is transmitted to the spindle 110 through the second gear unit 1200' and the reduction gear unit 1300 to convert into the parking braking force, and the first gear unit 1100' rotates together with the second gear unit 1200' to prevent the spindle 110 from reversing after the parking braking force is generated and completed.

As described above, the first gear units 1100 and 1100' and the second gear units 1200 and 1200' according to the disclosure are provided to have the cross helical gear assembly structure or the worm gear assembly structure, and if they are provided to have different gear assembly structures, it is possible to provide high-efficiency parking braking force regardless of the assembly order, as well as perform a self-locking function.

As is apparent from the above, various embodiments of the present disclosure may provide the EPB capable of providing high-efficiency parking braking force using a single motor and performing a self-locking function, and a method of operating the same. In other words, the first and second gear units are provided to have the cross helical gear assembly structure and the worm gear assembly structure, respectively, so that it is possible to realize low noise and high efficiency parking braking force and maintain the parking force (self-locking).

Furthermore, various embodiments of the present disclosure may provide the EPB capable of reducing the volume and overall length of the brake system as the first and second gear units have the same rotating central shaft and are coaxially connected to the spindle, and a method of operating the same.

Furthermore, various embodiments of the present disclosure may provide the EPB capable of compacting as the first and second gear units receiving rotational force through one motor have the same gear ratio and are coupled to rotate together, and a method of operating the same.

As described above, the exemplary embodiments of the disclosure have thus far been described with reference to accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. An electric parking brake including a ball-screw type power conversion unit installed in a caliper housing to convert a rotational force into a linear motion, comprising:

a motor configured to generate a rotational force;

a first gear unit including a first connection portion, the first connection portion directly connected to a main helical gear provided on a motor shaft of the motor;

a second gear unit including a second connection portion, the second connection portion spaced apart from the first connection portion by a predetermined distance and directly connected to the main helical gear; and a reduction gear unit connected to any one of the first gear unit and the second gear unit and configured to transmit the rotational force generated from the motor to a spindle of the power conversion unit;

wherein the first gear unit is configured to have a cross helical gear assembly structure and the second gear unit is configured to have a worm gear assembly structure, and wherein the second gear unit is configured to perform a self-locking function when a parking braking force is generated.

2. The electric parking brake of claim 1, wherein the first gear unit further comprises:

the first connection portion including a first vertical helical gear meshed with the main helical gear, a first connection shaft coupled to a rotation center of the first vertical helical gear to rotate, and a first bearing portion provided on the first connection shaft, a first helical gear provided on the first connection shaft to rotate together with the first connection shaft, and a second helical gear meshed with the first helical gear to change a rotation direction, wherein the second gear unit further comprises:

the second connection portion including a second vertical helical gear meshed with the main helical gear, a second connection shaft coupled to a rotation center of the second vertical helical gear to rotate, and a second bearing portion provided on the second connection shaft, a worm gear provided on the second connection shaft to rotate together with the second connection shaft, and a worm wheel gear meshed with the worm gear to change a rotation direction, wherein the worm wheel gear and the second helical gear have a same rotating central shaft.

3. The electric parking brake of claim 2, wherein the worm wheel gear and the second helical gear have the same gear ratio.

4. The electric parking brake of claim 2, wherein the worm wheel gear and the second helical gear are disposed to face each other, and the worm wheel gear and the second helical gear include a coupling portion, the coupling portion allowing the worm wheel gear and the second helical gear to be coupled to each other to rotate together.

5. The electric parking brake of claim 4, wherein the coupling portion further comprises:

a first coupling portion protruding from a center of the second helical gear toward the worm wheel gear, and a second coupling portion protruding from a center of the worm wheel gear toward the second helical gear and press-fitted with the first coupling portion.

6. The electric parking brake of claim 5, wherein the worm wheel gear or the second helical gear has gear teeth formed along an outer circumferential surface and has a cylindrical shape with one side open to have an accommodating space therein, and the accommodating space is provided with the first coupling portion or the second coupling portion.

7. The electric parking brake of claim 2, wherein the second helical gear or the worm wheel gear further comprises:

a gear portion formed in a ring shape with gear teeth formed on an outer circumferential surface thereof, and having fastening grooves formed at regular intervals along an inner circumferential surface thereof, and a rotating portion having fastening protrusions formed on an outer circumferential surface thereof so as to be mounted on the fastening grooves, wherein the rotating portion is configured to rotate together with the gear portion.

8. The electric parking brake of claim 2, wherein the reduction gear unit further comprises:

a sun gear provided at a center of the worm wheel gear or the second helical gear and configured to rotate together with the worm wheel gear or the second helical gear, a plurality of planetary gears meshed with the sun gear, a ring gear formed as an internal gear to accommodate the plurality of planetary gears, and a carrier that rotatably supports the plurality of planetary gears, is installed to rotate coaxially with the sun gear, and outputs rotational power.

9. The electric parking brake of claim 8, wherein an output hole in which an internal gear is formed to be gear-coupled to the spindle is provided at a center of the carrier.

10. The electric parking brake of claim 8, further comprising:

a rotating central shaft passing through the sun gear and having one end press-fitted to the spindle and the other end press-fitted to the center of the second helical gear or the worm wheel gear.

11. The electric parking brake of claim 1, wherein the power conversion unit includes a spindle rotating by receiving the rotational force from the reduction gear unit, a nut screw-coupled to the spindle to move forward or backward by rotation of the spindle, and a plurality of balls interposed between the spindle and the nut.

* * * * *